United States Patent [19]

Campbell, Jr. et al.

[11] 3,835,736
[45] Sept. 17, 1974

[54] VALVE ACTUATING MEANS

[75] Inventors: George E. Campbell, Jr., Glen Riddle; Julius Lerner, Broomall, both of Pa.

[73] Assignee: Sun Oil Company of Pennsylvania, Philadelphia, Pa.

[22] Filed: Mar. 14, 1973

[21] Appl. No.: 341,225

[52] U.S. Cl. .............................. 81/180 R, 251/93
[51] Int. Cl. ............................................. B25b 13/58
[58] Field of Search .......... 81/53 R, 63, 90 B, 90 C, 81/90 E, 90 F, 121 B, 180 R; 29/213, 240; 251/291, 293; 137/382.5

[56] References Cited
UNITED STATES PATENTS

| | | | |
|---|---|---|---|
| 1,931,751 | 10/1933 | Brown et al. ................ | 251/293 X |
| 2,077,997 | 4/1937 | Hedene ........................ | 81/121 B X |

FOREIGN PATENTS OR APPLICATIONS

| | | | |
|---|---|---|---|
| 638,714 | 3/1962 | Canada ........................ | 29/213 |

Primary Examiner—Al Lawrence Smith
Assistant Examiner—James G. Smith
Attorney, Agent, or Firm—George L. Church; Donald R. Johnson; Frank A. Rechif

[57] ABSTRACT

A rigid adapter member, provided with a non-circular wrenching surface which is adapted to mate with a similar non-circular wrenching surface provided in a ratchet wrench, is non-rotatably secured to the handwheel of a valve which is to be actuated.

6 Claims, 4 Drawing Figures

PATENTED SEP 17 1974      3,835,736

VALVE ACTUATING MEANS

This invention relates to a valve actuating means, and more particularly to a manually-operable means for rotating a valve handwheel.

Normally, the initial and final action involved in opening or closing, respectively, a manually-operated process block valve larger that about the three-inch size includes the use of a tool known as a valve wrench or spanner. This tool may be needed to ensure a tight seating upon valve closure, and to overcome the initial friction when opening the valve from the seated position.

Quite often, however, the existing tool must be utilized over the whole range of "valve open" to "valve closed," due to the torque required to sustain the circular operating path of the valve wheel or handle. This high torque is the result of excessive friction inherent in the valve mechanism, or friction imparted by high pressures exerted on one side of the valve internals by the contained process fluid.

The procedure involving the use of the known tool over the full travel of the valve, from closed to open, or vice versa, is time-consuming and inefficient even under normal (non-emergency) conditions, because the tool must be completely removed from the valve handwheel, and reapplied thereto, upon each rotation of the tool through a convenient (usually small) angle. During any emergency which requires the rapid opening or closing of a block valve, or several such valves, this time-consuming type of procedure is definitely undesirable, since rapid action is vital to personnel and equipment safety.

An object of this invention is to provide a novel manually-operable valve actuating means.

Another object is to provide a valve actuating means which is easier to operate (and therefore faster in operation) than the known tool.

A further object is to provide a valve actuating means (for performing all actions involved with opening or closing of a manually-operated process block valve) which is more efficient than the known, existing valve tool.

A detailed description of the invention follows, taken in conjunction with the accompanying drawing, wherein.

Figure 4:
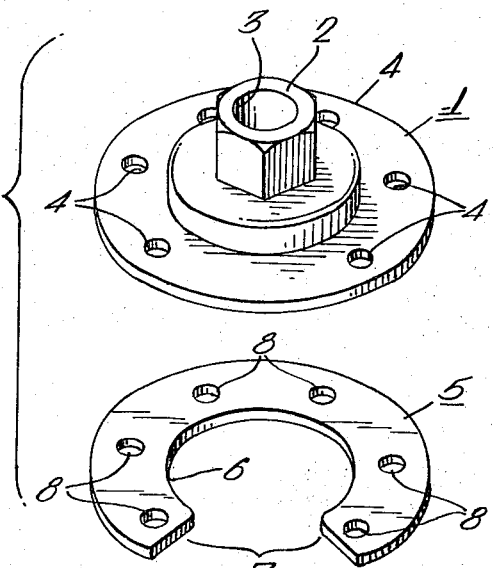
FIG. 4 is an isometric view of two adapter plates.

Refer first to FIG. 4. A rigid plate 1, of circular outer configuration, comprises one piece of a two-piece adapter which is constructed and arranged to be secured to a valve handwheel To one face of plate 1, at the center thereof, there is rigidly secured, as by welding, an outstanding boss 2 which is illustrated as having a hexagonal outer configuration, although it may, as will later be explained, have other non-circular outer configurations. A central hole 3 extends through boss 2 and plate 1, for a purpose which will later become apparent.

A plurality of bolt holes 4, illustrated as six in number, are provided in plate 1, the holes 4 being centered on a common base circle near the outer periphery of the plate, and being disposed non-uniformly on this base circle.

A rigid plate 5, of circular outer configuration, comprises the other piece of the two-piece adapter previously mentioned. Plate 5 has the same O.D. as plate 1, and is essentially a ring, having a large central aperture 6 which is adapted to surround the body of a valve. The plate (ring) 5 has therein a gap 7 which communicates with the aperture 6; the ring 5 is thus not continuous. Plate 5 has therein a plurality of bolt holes 8 which are centered on a base circle whose diameter is the same as that of the base circle for holes 4; the holes 8 are arranged to be aligned respectively with the holes 4 when the plates 1 and 5 are superposed.

Figure 1:
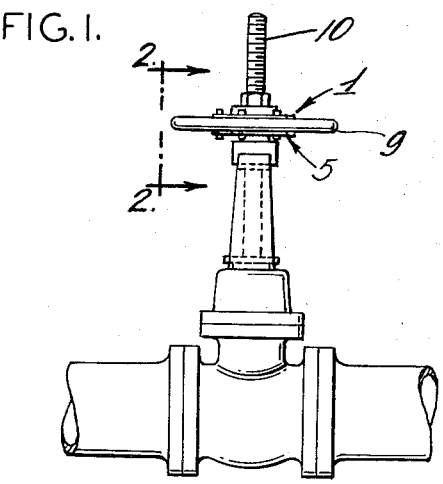
FIG. 1 is an elevation of a valve, illustrating the adapter of the invention in place thereon.
Figure 3:
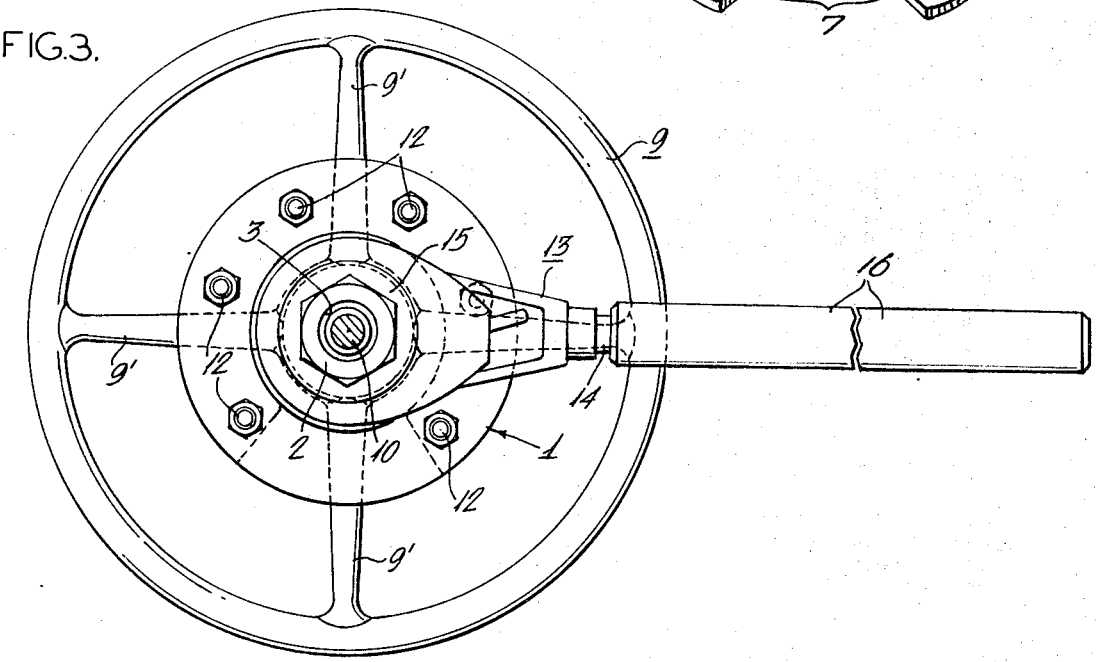
FIG. 3 is a plan view of the FIG. 2 arrangement.
Figure 2:
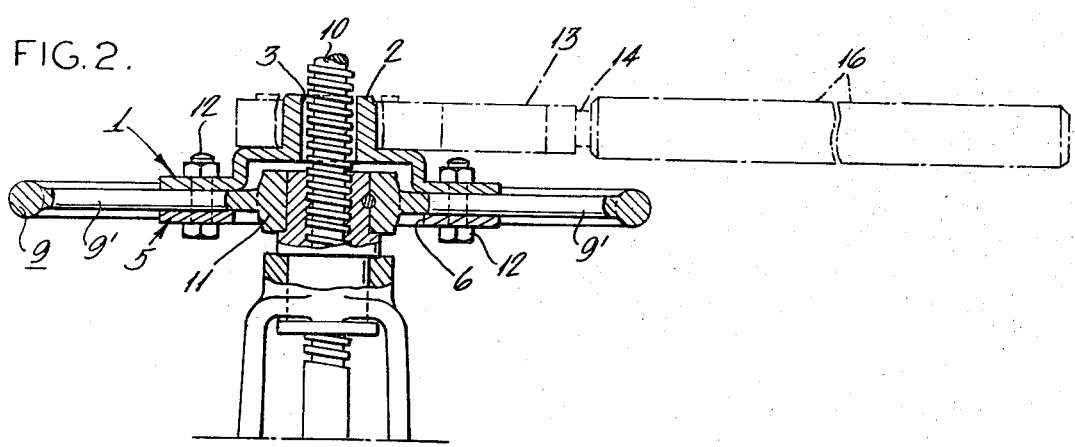
FIG. 2 is a view partly in section looking in the direction 2—2 of FIG. 1, but showing a ratchet wrench applied thereto.

Refer now to FIGS. 1-3, which illustrate the adapter of this invention in operative position on (mounted on, or secured to) a valve handwheel. The plate 1 is placed on the side of the valve handwheel 9 (which may have four spokes, as illustrated in FIG. 3) opposite to the valve body (see FIG. 1), with the stem 10 of the valve extending through the hole 3; the hole 3 permits the valve stem 10 to rise or fall, during rotation of the handwheel 9 (which is to say, during actuation of the valve). It is pointed out that the handwheel is of the conventional type found on most valves and includes a generally circular annular rim or frame and a plurality of spokes 9' which extend radially from a hub 11 (through which the stem 10 passes) and interconnect the annular rim mentioned with the hub. The outer rim and the spokes are generally of circular cross-section, but they need not be. Although four spokes at 90° to each other are illustrated, the adapter of the invention is applicable to handwheels having other numbers of spokes, such as six, for example. The staggered or non-uniform arrangement of the bolt holes 4 (and also 8) enables the adapter of the invention to be used with various configurations of handwheels (and various numbers of spokes).

The ring-shaped plate 5 is placed on the side of handwheel 9 opposite the first plate 1, that is, on the side adjacent the valve body (see FIG. 1). The large central aperture 6 of plate 5 allows this plate to surround the valve body, with ample clearance. Gap 7 enables plate 5 to be placed in position around the valve body without having to remove the handwheel 9 from the valve.

When the two pieces or parts (two plates) 1 and 5 have been placed in position on the valve handwheel 9 as described, a plurality of bolts 12 are passed through aligned holes 4 and 8 in the plates 1 and 5, respectively, and are tightened to fasten the plates securely together with the handwheel 9 therebetween, so that the two pieces of the adapter (particularly the plate 1, with its boss 2) are firmly clamped to the spokes of the valve handwheel. It may be noted that the boss 2 is located on the exposed side of the valve handwheel, and is now firmly secured to such handwheel.

Once the adapter 1, 5 has been mounted in position on the valve handwheel 9, a more or less conventional reversible ratchet wrench 13 may be utilized to rotate the valve handwheel, i.e., to actuate the valve. The ratchet wrench 13 may for example be constructed as shown in U.S. Pat. No. 2,869,410, and includes a handle 14 carrying a ratcheted socket 15 (illustrated as hexagonal, matching the hexagonal outer configuration of boss 2). The valve handwheel 9 may be rotated with the ratchet wrench 14, by engaging the boss 2 of the adapter with the mating socket 15 of the ratchet wrench 13.

An outer sleeve member 16 may be arranged to telescope over the wrench handle 14, as shown in FIG. 3, to provide an extendable handle. The member 16 may be releasably retained in various adjusted positions, for example, by means of the detenting arrangement shown in the aforementioned patent. Or, member 16 may be threadably coupled to handle 14, or a pin-and-hole arrangement may be utilized to couple members 14 and 16 together. By means of the member 16, the effective length of the operating handle of the ratchet wrench 13 may be varied.

The valve actuating means of this invention, which utilizes a ratchet wrench and clamped-on adapter, eliminates the cumbersome detachment and reattachment required with all prior, known devices. The means described herein provides many additional positions (due to the ratchet action) from which to apply force, and is not restricted to valve wheel spoke orientation, as are all known devices. As a consequence of the foregoing, the means of this invention increases the speed with which a tight valve may be turned, which has significant implications during an emergency condition.

The telescoping handle design of the wrench allows this single device to be adjusted for varying torque application requirements, eliminating the need for an array of tools, or the use of "cheater" extensions which overtax the capabilities of a given tool.

Various modifications of the structure disclosed are possible. A hexagonal boss may be directly welded or brazed to the valve handwheel, rather than being clamped thereto by means of an adapter.

The hexagonal boss on the top plate 1 may be replaced by two bosses, the two bosses straddling one center line and being on the other center line. In this case, each boss would have a hole in it, and the bosses would be engaged by two pins on a ratchet spanner wrench.

The boss for engaging the ratchet wrench can be other than hexagonal. For example, it may be square, it may be a spline, it may be a key, etc. The hole in the ratchet wrench would be arranged to mate with whatever shape boss is utilized.

If the valve to be actuated is not of the so-called "rising stem" type, the hexagonal hole could be in the valve adapter (attachment), and the matching boss on the ratchet wrench.

We claim:

1. An adpater for enabling a valve handwheel to be rotated by means of a ratchet wrench, comprising a first rigid plate having thereon a non-circular wrenching surface adapted to mate with a similar non-circular wrenching surface provided in a ratchet wrench; a second rigid plate adapted to engage the valve body side of the handwheel, opposite said first plate, and means fastening the two plates together, with the handwheel therebetween; said second plate having therein a central aperture and also having therein a gap communicating with said aperture, whereby said second plate may be positioned on the valve body side of the handwheel, by means of said gap, without removing said handwheel.

2. Adapter according to claim 1, wherein said first plate has an aperture therein, to allow passage therethrough of the stem of the valve.

3. Adapter recited in claim 1, wherein said first plate is provided with a plurality of angularly-related planar wrenching surfaces adapted to mate with the planar wrenching surfaces of a ratchet wrench.

4. Valve actuating means comprising, in combination, a first rigid adapter member provided with a non-circular wrenching surface; a second rigid adapter member adapted to engage the valve body side of the handwheel, opposite said first member, means fastening the two members together, with the handwheel therebetween, and a ratchet wrench provided with a non-circular wrenching surface adapted to mate with the wrenching surface on said first member.

5. Combination according to claim 4, wherein said first member has an aperture therein, to allow passage therethrough of the stem of the valve.

6. Combination recited in claim 4, wherein said first member is provided with a plurality of angularly-related planar wrenching surfaces, and wherein said ratchet wrench is provided with a plurality of similar planar wrenching surfaces.

* * * * *